United States Patent
Buchtel et al.

[15] 3,653,078
[45] Apr. 4, 1972

[54] PORTABLE DENTAL BOWL CONSTRUCTION

[72] Inventors: Dean H. Buchtel; Kenneth R. Lappin; John A. Maurer, all of Canton, Ohio

[73] Assignee: The Weber Dental Manufacturing Company, Canton, Ohio

[22] Filed: Oct. 28, 1970

[21] Appl. No.: 84,785

[52] U.S. Cl. ..........................................................4/263
[51] Int. Cl. ....................................................A61c 17/04
[58] Field of Search.....................4/258, 262, 263, 264, 265, 4/266

[56] References Cited

UNITED STATES PATENTS

| | | | |
|---|---|---|---|
| 3,066,318 | 12/1962 | Albigese | 4/263 |
| 3,226,733 | 1/1966 | Ashton | 4/263 |
| 3,259,430 | 7/1966 | Beach | 297/194 |
| 3,281,868 | 11/1966 | McGouirk | 4/263 |
| 3,295,148 | 1/1967 | Deeley, Jr. et al. | 4/263 |
| 3,400,412 | 9/1968 | Turner | 4/263 |
| 3,530,513 | 9/1970 | Maurer et al. | 4/263 |

*Primary Examiner*—Samuel B. Rothberg
*Assistant Examiner*—Donald B. Massenberg
*Attorney*—Frease & Bishop

[57] ABSTRACT

A portable bowl construction which may be mounted removably on a dental chair, or a dental tray, or which the patient may hold. The portable bowl has flush water and drain connections. There are dual controls for a solenoid valve that controls the supply of water not only to flush the bowl but also to a venturi vacuum pump connected to the bowl drain. The dual controls include control switches at two locations, such as at a dental tray and at a dental unit, accessible at one location to the dentist, and at a second location at the same time to a dental assistant, for control from either location of the water supply to the bowl. The bowl may be flushed by operation of a push button valve at the bowl by the patient, dentist, or dental assistant whenever one of the two control switches has been operated for supplying water to the bowl.

6 Claims, 5 Drawing Figures

INVENTORS
DEAN H. BUCHTEL,
KENNETH R. LAPPIN,
and JOHN A. MAURER

BY *Frease & Bishop*

ATTORNEYS

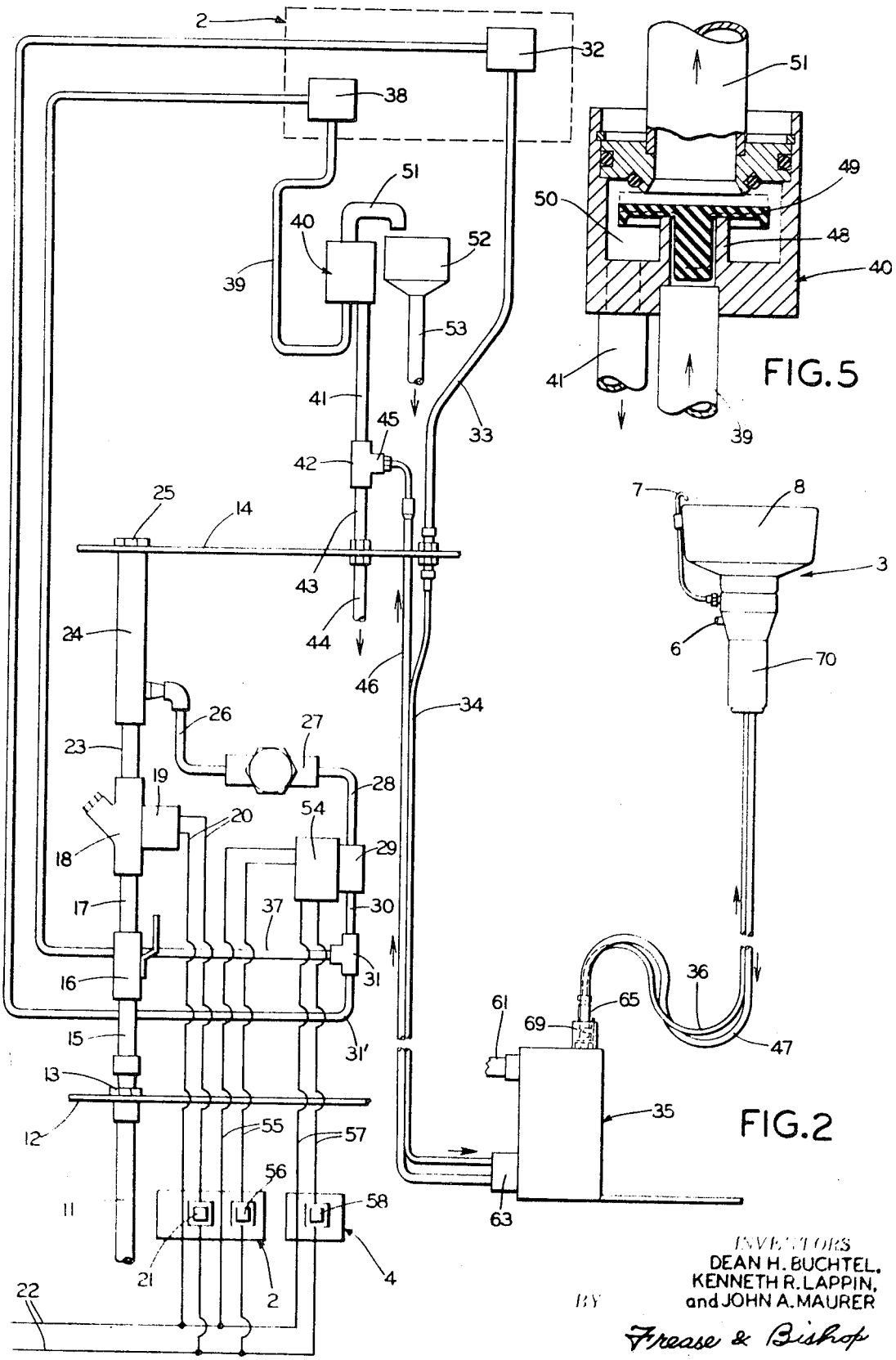

3,653,078

PORTABLE DENTAL BOWL CONSTRUCTION

BACKGROUND OF THE INVENTION

1. Field of the Invention

The invention relates to dental bowl or cuspidor apparatus; and more particularly to a portable bowl construction and to dual controls of the water supply to the bowl by either the dentist or the dental assistant at the same time at separate locations. The water supply to flush the bowl when a flush valve is opened, also provides vacuum to the bowl drain, which similarly is controlled by the dual controls at the same time that the water supply to flush the bowl is controlled.

2. Description of the Prior Art

Portable dental equipment bowls have been used having a valve at the bowl which is operated to flush the bowl by any one holding or adjacent the bowl, there being a supply of water at the bowl valve at all times. However, such portable bowl construction sometimes involves problems in use particularly when a child is the patient and is holding the bowl. The child at a time when not desired may operate the bowl flush valve which turns on and sprays water in the bowl. Also, the child may operate the flush valve when the bowl is in a position such that water spills from the bowl onto the floor, the patient, or the dentist. These situations can occur because of lack of control of the supply of water to the bowl or bowl flush valve; and have presented problems in the art.

SUMMARY OF THE INVENTION

Objectives of the invention include providing a portable dental bowl with dual controls for the water supply to the bowl flush valve located at the bowl, so that the bowl can only be flushed when the dentist or dental assistant intends to permit bowl flushing; providing a portable dental bowl with dual controls for the water supply to the bowl, located at separate locations accessible at any time either to the dentist or the dental assistant or both; providing dental bowl flushing equipment to control the water supply to the bowl system not only for flushing the bowl but also for simultaneously operating a vacuum pump which supplies vacuum to the bowl drain; providing dental bowl flushing equipment in which the supply of water for bowl operation is conserved and water only flows to the vacuum pump for the bowl drain during the time interval when the dentist or dental assistant may wish to permit bowl flushing; and providing portable dental bowl construction and controls which satisfy the stated objectives, which use simple components, and which avoid difficulties heretofore encountered in a simple, effective and inexpensive manner, and which solve problems and satisfy existing needs in the art.

These objectives and advantages are obtained by the construction, the general nature of which may be stated as including portable dental bowl means having a flush valve operable to discharge water into the bowl, and drain means for the bowl; a main water supply, manual shutoff valve means for the main water supply; solenoid operated main water supply valve means, control means for actuating the main solenoid valve means preferably located at a first station; pressure regulator means for water delivered from the main water supply having a pressure regulator outlet; solenoid operated bowl water control valve means connected to said pressure regulator outlet; said bowl water control valve means having a bowl water outlet, branch bowl-flush-water supply pipeline means connected with said bowl water outlet and the bowl flush valve, first metering valve means located in said branch bowl flush pipeline between the bowl water control valve means and the bowl flush valve; venturi-type hydraulic vacuum pump means, branch vacuum pump pipeline means connected with said bowl water outlet and said vacuum pump means, second metering valve means located in said branch vacuum pump pipeline between the bowl water control valve means and the vacuum pump means; vacuum breaker means in said branch vacuum pump pipeline between said metering valve means and said vacuum pump means; vacuum drain line means connected with said vacuum pump means and said bowl drain means; drain outlets for said vacuum pump means and said vacuum breaker means; said first and second metering valve means preferably being located at said first station; the bowl water control valve means including a first actuating button at said first station; and said bowl water control valve means also including a second actuating button at a second station spaced from said first station, whereby bowl water supply to said bowl flush valve and vacuum pump means may be controlled by an operator at either station.

BRIEF DESCRIPTION OF THE DRAWINGS

A preferred embodiment of the invention — illustrative of the best mode in which applicants have contemplated applying the principles — is set forth in the following description and shown in the drawings and is particularly and distinctly pointed out and set forth in the appended claims.

FIG. 2 is a diagrammatic view illustrating piping connections, components and electrical control lines provided for the improved portable dental bowl construction;

FIG. 5 is an enlarged fragmentary view, partially in section, showing a vacuum breaker used in the improved construction.

Similar numerals refer to similar parts throughout the drawings.

DESCRIPTION OF THE PREFERRED EMBODIMENT

Figure 1:
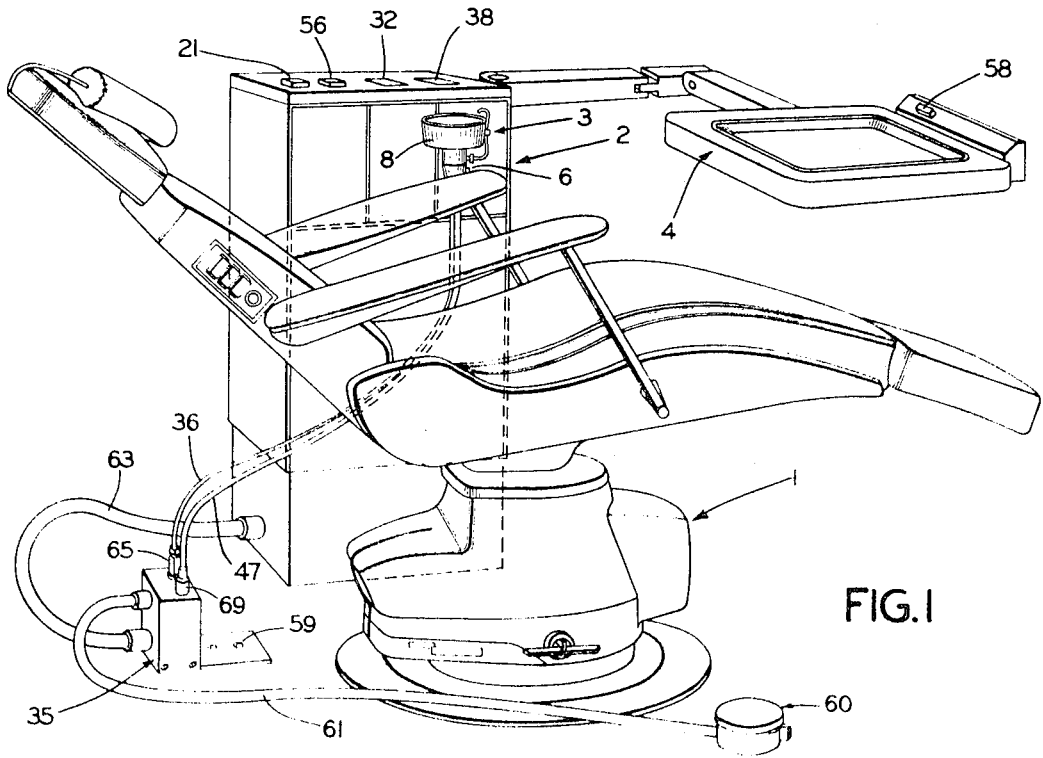
FIG. 1 is a perspective view of a dental chair and dental unit with which the improved portable dental bowl construction is associated and combined.

The invention is shown typically in the drawings incorporated in a portable bowl system associated with a dental chair 1 and a dental cabinet or unit 2. The chair 1 and cabinet 2 may be of any desired type or construction, and the cabinet 2 may be mounted on a wall or on a floor and may have suitable plumbing connections for a main water supply and drain or waste facilities which may be connected to the improved portable bowl construction including the portable bowl generally indicated at 3.

The bowl 3 may be removably supported in any suitable manner on the dental chair 1, as shown, within easy reach of a patient resting, sitting, or reclining on the chair. Alternately, if desired, bowl 3 may be removably supported on the cabinet 2 or on a usual typical dental tray generally indicated at 4 movably mounted on cabinet 2.

The tray 4 normally is conveniently accessible to the dentist when working on a patient in chair 1, and the cabinet 2 normally is conveniently accessible to a dental assistant who is assisting the dentist working on a patient. The cabinet 2 and tray 4 thus have separate locations accessible at the same time, one location or station accessible to the dentist and a second location accessible to the dental assistant.

The portable bowl 3 has a flush valve 5 operated by pushing button 6 for discharging water supplied to the bowl 3 through a spout 7 into the bowl member 8. Bowl member 8 is provided with a drain sump 9 to which a drain hose section 10 is connected. A main water supply pipe 11 for water for the bowl system and for other accessories which may be housed in cabinet 2 may extend through a partition support member 12 and is supported thereon by flange 13. Support member 12 is mounted in any suitable manner within cabinet 2 near the bottom thereof. One other support member 14 also may be mounted within cabinet 2 spaced above member 12.

Water in main supply pipe 11 then flows through pipe section 15 to manual water shutoff valve 16. Valve 16 preferably is provided so as to permit repairs to any water lines beyond valve 16 and also to provide a cutoff in case of power failure which might affect operation of solenoid operated valves or other components of apparatus housed in cabinet 2. A conduit 17 connects manual valve 16 with solenoid operated main water supply valve 18 which normally acts as a main water control valve for cabinet 2 and all accessories therein which are supplied with water. Valve 18 is operated by a solenoid indicated at 19 which may be energized by closing a circuit 20 by actuating a master switch control button 21 connected with a source of power 22. Master switch 21 preferably is conveniently accessibly located at cabinet 2 as illustrated in FIG. 1.

Water flowing through valve 18 when the valve is open, then flows through conduit 23 to a manifold 24 mounted at 25 on partition 14. Manifold 24 may serve as the source of water supply for all accessories which may be housed in cabinet 2.

For the purposes of the improved portable dental bowl construction, a conduit 26 runs from manifold 24 to a water filter 27 for the accessories supplied with water from the pressure filter 27 through its pipe outlet 28. A solenoid operated bowl water control valve 29 is connected with the outlet 28, and outlet pipe 30 from valve 29 is connected to a tee 31. A branch bowl-flush-water supply pipeline 31' extends from tee 31 through a metering valve 32 with control member which may be located accessibly at cabinet 2, and then through conduit 33 and flexible conduit 34 to a junction box 35 and from junction box 35 through a flexible tube 36 to bowl flush valve 5.

A second branch vacuum pump pipeline 37 extends from tee 31 to another metering valve 38 with control member also located accessibly at cabinet 2. Conduit 39 connects metering valve 38 to the vacuum breaker generally indicated at 40. Vacuum-breaker outlet pipe 41 is connected with the inlet of venturi-type hydraulic vacuum pump 42 having a water outlet pipe 43 discharging through drain line 44 to a drain or waste pipe connection in cabinet 2. The suction inlet 45 of vacuum pump 42 is connected by flexible tube 46 through junction box 35 with drain hose 47 which terminates in drain pipe section 10 in bowl assembly 3.

Vacuum breaker 40 (FIG. 5) has a usual construction with a valve seat 48 for a lifter valve 49. When water is flowing through vacuum breaker 40 from supply line 39, lifter valve 49 raises to the dot-dash line position illustrated in FIG. 5 closing off the inner compartment 50 and the water flows through outlet 41 to vacuum pump 42. In case of back siphonage of the water system, lifter valve 49 releases the opening to air. Water discharged from the system through air vent 51 flows into sump 52 connected through drain pipe 53 with the drain or waste pipe connection in cabinet 2.

The solenoid 54 of valve 29 may be operated to open the valve by a control switch in circuit lines 55 having an actuating button 56 located at cabinet 2, as diagrammatically illustrated in FIG. 2. The solenoid 54 of valve 29 also may be operated to open the valve by operating a control switch in circuit lines 57 having an actuating button 58 preferably located at the dental tray 4, as shown in FIG. 1. The circuits for the control switches actuated by buttons 56 and 58 are connected to power line 22.

Figures 3, 4:
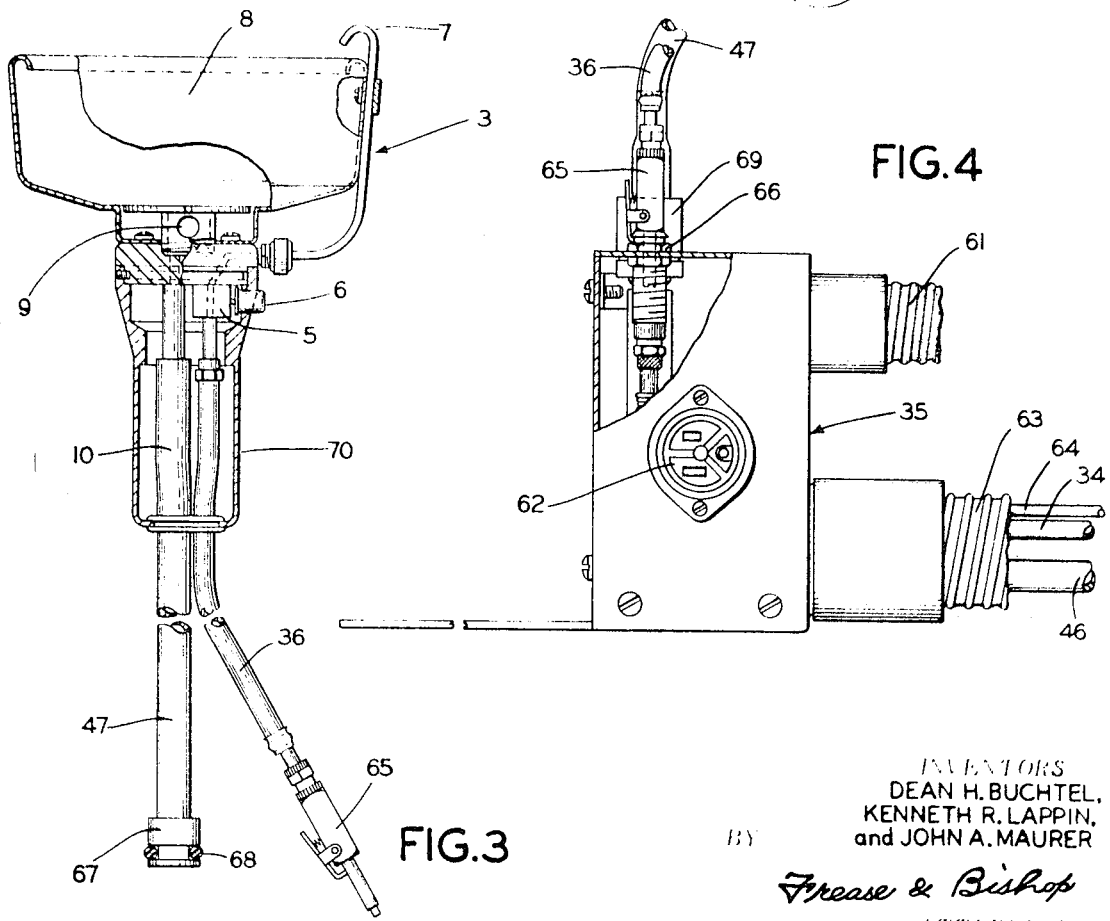
FIG. 3 is an enlarged fragmentary view, with parts in section, of a portable dental bowl used in the improved construction.
FIG. 4 is an enlarged side view of a junction box assembled with the portable bowl shown in FIG. 3 and the chair and unit of FIG. 1 to provide the new construction.

Junction box 35 may be secured to the floor adjacent dental chair 1 (FIG. 1) by screws 59 or other suitable mounting means, and junction box 35 serves a variety of functions. The foot controller 60 for operating desired dental equipment accessories, such as dental handpieces (not shown), may be connected through flexible conduit 61 with junction box 35 and electrical power and air lines may pass through conduit 61 between foot controller 60 and junction box 35. An electrical outlet receptacle 62 (FIG. 4) may be mounted on junction box 35.

Another flexible conduit 63 extends between junction box 35 and cabinet 2, and air, electric power, water and drain lines may pass through conduit 63 between junction box 35 and cabinet 2. These lines may include the bowl-flush-water supply pipeline conduit 34 (FIG. 2), the vacuum drain line 46, and the power line 64 for receptacle 62. Line 64 may pass through conduit 63 to cabinet 2 and may be connected with electric power supply 22 to cabinet 2.

The portable bowl assembly 3 and its connected water supply and drain conduits 36 and 47 preferably are detachably connected with junction box 35 to permit cleaning, servicing, etc., of the portable bowl assembly components. This may be accomplished by providing a hose quick connector 65 (FIG. 3) for conduit 36 which may be detachably connected to receptacle 66 mounted on junction box 35. Receptacle 66 is in turn connected to conduit 34 which runs through flexible conduit 63. The suction drain hose 47 may have a connector head 67 (FIG. 3) equipped with an O-ring 68 which telescopes into a connector member 69 carried by junction box 35. Connector member 69 in turn is connected to vacuum drain tube 46 which also runs through conduit 63 to cabinet 2.

The water filter 27 in normal operation and use of the improved portable dental bowl construction, is used to filter water to valve 5 to flush the bowl 3. Metering valve 32 also is adjusted to control the volume of water flowing to the bowl flush spout 7. Metering valve 38 also is adjusted to control the volume of water supplied at the selected pressure to the venturi-type vacuum pump 42. Normally these adjustments, once made, need not be changed excepting when water supply pressure from the water main may change significantly.

Normally, at night, and when the equipment is not in use, the main water supply valve 18 will be closed, and this is accomplished by actuating switch button 21 accessible at cabinet 2. When the equipment is being prepared for a patient, main water supply valve 18 is opened by operating control switch 21. Normally, the bowl water control valve 29 is closed, so that water is not flowing through the vacuum pump 42 and wasted down the drain, and so that there is no water supply under pressure available at the portable bowl 3 which would be discharged when flushed by pushing valve button 6 accidentally or when not intended for use.

When the equipment is in use, the portable bowl 3 may be held by one hand of a patient grasping hand hold 70, which also may be held releasably in a grip (not shown) to support bowl 3 on chair 1.

The dentist, or dental assistant, serving a patient knows when use or flushing of the bowl may be desired. At such time either the dentist, or the dental assistant, can actuate one or the other of control buttons 56 and 58 located respectively at cabinet 2, or tray 4, to open valve 29, thereby supplying water to the bowl 3 and to vacuum pump 42. At this time, the patient may use and flush the bowl by pressing flush valve button 6. Flush water then is discharged through spout 7 into the bowl member 8 and the suction on drain 47 draws off the contents of the bowl and discharges it to a waste pipe through drain conduit 44.

The new portable dental bowl construction is very simple in construction and operation and utilizes standard components for the solenoid control valves, metering valves, pressure regulator, control switches, etc. Similarly, the water system components including the vacuum breaker, vacuum pump, piping and conduits, comprise standard components. These components do not require delicate adjustments and require little, if any, servicing.

The improved construction and system enables complete control of the water supply for the bowl system, both for flushing and vacuum drainage, and permits the water supply to be cut off and turned on conveniently and accessibly by use of the dual control switches 56 and 58 accessible to the dentist and dental assistant. This arrangement prevents spilling or discharge of water from the portable bowl, either accidentally or from a bowl flushing operation when the bowl is tilted, or when flushing is not necessary or desired.

Accordingly, the improved construction achieves the objectives indicated and solves problems that have existed in the art, particularly in the use of portable dental bowl devices in a dental office by children.

In the foregoing description, certain terms have been used for brevity, clearness, and understanding; but no unnecessary limitations are to be implied therefrom beyond the requirements of the prior art because such terms are used for descriptive purposes and are intended to be broadly construed.

Moreover, the description and illustration of the invention is by way of example, and the scope of the invention is not limited to the exact details shown or described since the features of the invention may be applied to a construction for various uses. For example, rather than being used in a dentist's office as a part of dental equipment, the construction may be used in the office of a nose and throat doctor, or in any other place where bowl or cuspidor facilities of a portable nature may be desired.

Having now described the features, discoveries and principles of the invention, the manner in which the improved construction is made, the characteristics of the new construction, and the advantageous, new and useful results obtained, the new and useful structures, devices, elements, arrangements, parts, combinations and subcombinations are set forth in the appended claims.

We claim:

1. Portable dental bowl construction including portable bowl means having a bowl, a flush valve operable to discharge water into the bowl, and drain means for the bowl; a main water supply, solenoid operated bowl water control valve means connected to said main water supply having a bowl water outlet; branch bowl-flush-water supply pipeline means connected with said bowl water outlet and the bowl flush valve; venturi-type hydraulic vacuum pump means, branch vacuum pump pipeline means connected with said bowl water outlet and said vacuum pump means; vacuum drain line means connected with said vacuum pump means and said bowl drain means; and the bowl water control valve means including a first actuating button at a first station and a second actuating button at a second station spaced from said first station, whereby bowl water supply to said bowl flush valve and to said vacuum pump means may be controlled simultaneously by an operator at either station.

2. The construction defined in claim 1 in which solenoid operated main water supply valve means is connected with the main water supply, in which said main water supply valve means has outlet means, and in which the solenoid operated bowl water control valve means is connected with said outlet means.

3. The construction defined in claim 2 in which the main water supply valve means includes an actuating button at said first station.

4. The construction defined in claim 2 in which pressure regulator means is connected between said main water supply valve means and said bowl water control valve means.

5. The construction defined in claim 1 in which first metering valve means is located in the branch bowl-flush-water supply pipeline means, in which second metering valve means is located in the branch vacuum pump pipeline means, and in which the first and second metering valve means each include a control member located at said first station.

6. The construction defined in claim 1 in which vacuum breaker means is connected in said branch vacuum pump pipeline means between the bowl water control valve means and the vacuum pump means.

* * * * *